US012806945B2

(12) United States Patent
Harpster et al.

(10) Patent No.: US 12,806,945 B2
(45) Date of Patent: Nov. 24, 2026

(54) FRONT SUBFRAME MOUNTED RECOVERY HOOK

(71) Applicant: Honda Motor Co., Ltd., Tokyo (JP)

(72) Inventors: Steven Matthew Harpster, Dublin, OH (US); Rajendra L. Kakarla, Plain City, OH (US); Bradley W. Klein, Columbus, OH (US); Amol Gaikwad, Plain City, OH (US); Stephen G. Rosepiler, Marysville, OH (US); Kishan Chand Kari, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 18/615,816

(22) Filed: Mar. 25, 2024

(65) Prior Publication Data

US 2024/0227473 A1 Jul. 11, 2024

Related U.S. Application Data

(63) Continuation-in-part of application No. 18/087,324, filed on Dec. 22, 2022.

(51) Int. Cl.
*B60D 1/24* (2006.01)
*B60D 1/04* (2006.01)
(Continued)

(52) U.S. Cl.
CPC ............... *B60D 1/243* (2013.01); *B60D 1/04* (2013.01); *B60D 1/48* (2013.01); *B60D 1/56* (2013.01); *B60D 1/565* (2013.01)

(58) Field of Classification Search
CPC ... B60D 1/04; B60D 1/48; B60D 1/56; B60D 1/243; B60D 1/565
(Continued)

(56) References Cited

U.S. PATENT DOCUMENTS 5,054,806 A 10/1991 Chester
6,896,281 B2 5/2005 Lenzen, Jr. et al.
(Continued)

FOREIGN PATENT DOCUMENTS

CN 202294113 7/2012
CN 204340579 5/2015
(Continued)

OTHER PUBLICATIONS

Wildeson Front Demon Tow Hook Bracket with 3/4" Shackles Fit for Toyota Tacoma 2009-2021 Demon Shackle Mount Brackets. https://www.amazon.com/WILDESON-Bracket-Shackles-2009-2021-Brackets/dp/B09PZVR4TG/ref=sr_1_3?keywords=red+d+ring&qid=1660642924&s=automotive&sr=1-3.
(Continued)

*Primary Examiner* — Kevin Hurley
*Assistant Examiner* — Felicia L. Brittman-Alabi
(74) *Attorney, Agent, or Firm* — Mark E. Duell; Rankin, Hill & Clark LLP

(57) ABSTRACT

A recovery hook assembly includes a recovery hook fastened to a vehicle frame by a vertically oriented fastener and a horizontally oriented fastener, which connect the recovery hook to the vehicle at three connection points. When the recovery hook is pulled in the forward direction, the recovery hook remains connected to the vehicle to allow the vehicle to be towed. When the recovery hook is pushed in a rearward direction, the recovery hook moves rearward and can break away from the vehicle, thus maintaining crash performance of the vehicle.

20 Claims, 13 Drawing Sheets

(51) Int. Cl.
*B60D 1/48* (2006.01)
*B60D 1/56* (2006.01)

(58) Field of Classification Search
USPC .......................................................... 280/249
See application file for complete search history.

(56) References Cited

U.S. PATENT DOCUMENTS

| | | | |
|---|---|---|---|
| 7,222,873 B2 | 5/2007 | Rodgers | |
| 8,371,602 B1 | 2/2013 | Peschansky et al. | |
| 10,029,524 B2 | 7/2018 | Chang et al. | |
| 10,131,193 B2 | 11/2018 | Degenkolb | |
| 10,179,489 B2 | 1/2019 | Farooq et al. | |
| 10,882,568 B2 | 1/2021 | Greggs | |
| 11,148,490 B2 | 10/2021 | Takahashi et al. | |
| 11,214,107 B2 | 1/2022 | Greggs | |
| 11,364,755 B2 | 6/2022 | Greggs | |
| 2011/0285107 A1* | 11/2011 | Ladzinski .............. | B60D 1/565 280/495 |
| 2019/0351721 A1 | 11/2019 | Klein et al. | |

FOREIGN PATENT DOCUMENTS

| | | |
|---|---|---|
| CN | 111016558 | 5/2021 |
| FR | 2946569 | 6/2011 |

OTHER PUBLICATIONS

GSTP Front Bumper Tow Hook Right Left Heavy Duty D-Ring Set Compatible with Ford Expedition 2007-2015 Compatible with Ford F150 Truck 2009-2018 Red. https://www.amazon.com/GSTP-Compatible-Expedition-2007-2015-2009-2018/dp/B09TZN7WS2/ref=sr_1_5?keywords=red%2Bd%2Bring&qid=1660642924&s=automotive&sr=1-5&th=1.

Office Action of U.S. Appl. No. 18/087,324 dated Dec. 23, 2025, 10 pages.

Office Action of U.S. Appl. No. 18/087,324 dated Jul. 24, 2025, 14 pages.

* cited by examiner

FIG. 8
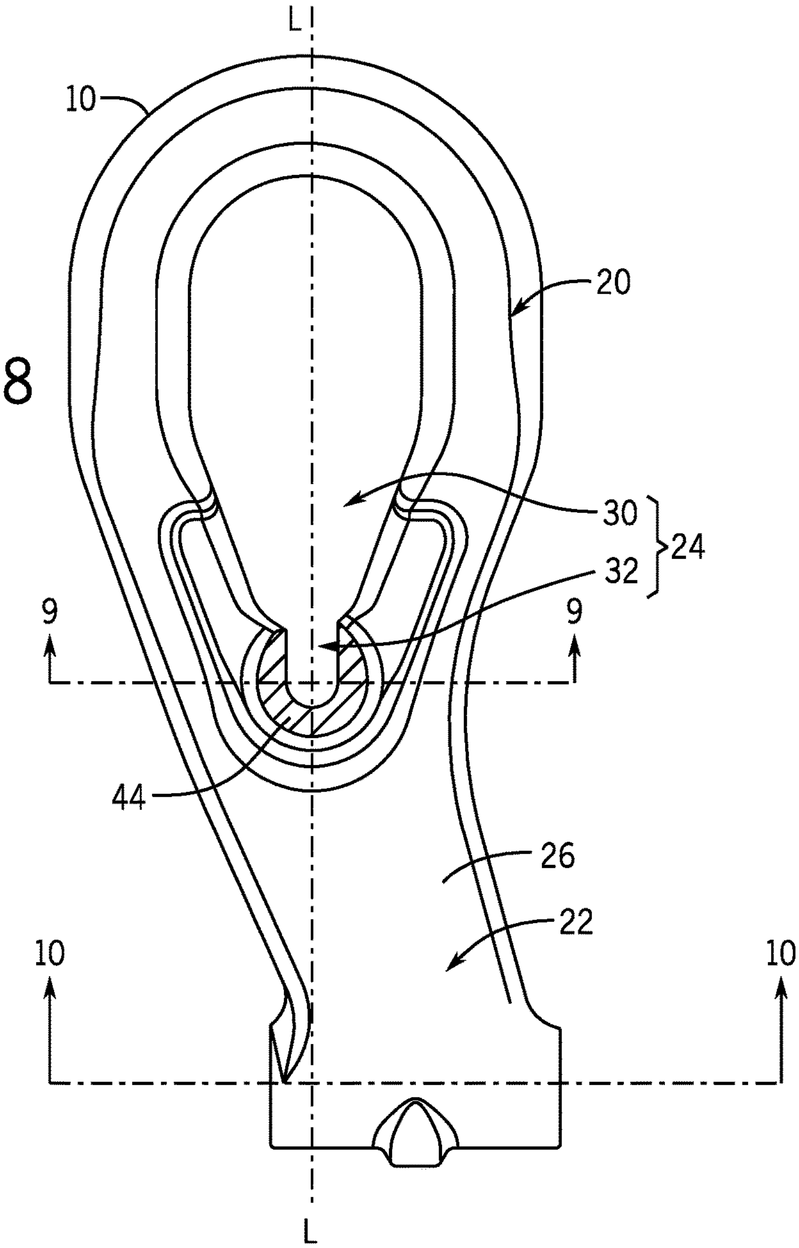
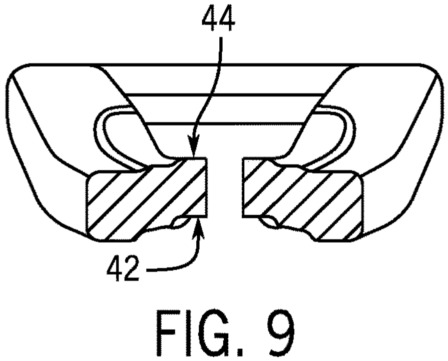
FIG. 9
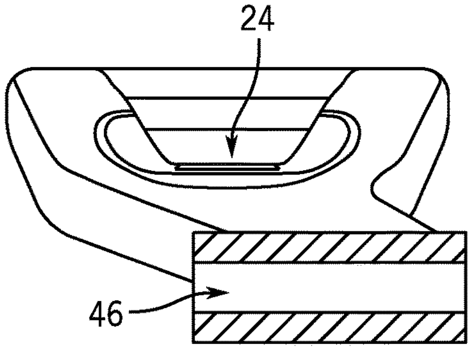
FIG. 10

FRONT SUBFRAME MOUNTED RECOVERY HOOK

The present application is a continuation-in-part of U.S. patent application Ser. No. 18/087,324, filed Dec. 22, 2022, the entirety of which is incorporated herein.

BACKGROUND

A recovery hook, also known as a tow hook, is a vehicle component that is used as a connection point for towing the vehicle. When a vehicle is immobilized at a particular location (e.g. stranded, often as a result of a loss of power, damage, missing components, or lack of traction), a towing apparatus can be connected to the recovery hook, and can be used to pull the vehicle and thus tow the vehicle from the location.

BRIEF DESCRIPTION

According to one aspect, a recovery hook for a vehicle includes a ring portion and a base portion. The ring portion includes a first through hole arranged at a front of the recovery hook. The first through hole includes a first section configured to connect with a towing apparatus for towing the vehicle. The first through hole also includes a second section that is smaller than the first section, is arranged at a back of the first section, has a front opening that opens into the first section, and is configured to accept a vertically oriented first fastener inserted therethrough for connecting the recovery hook to the vehicle. The base portion includes a second through hole arranged at a back of the recovery hook and configured to accept a horizontally oriented second fastener inserted therethrough for connecting the recovery hook to the vehicle.

The recovery hook may be included as part of a recovery hook assembly, which also includes the first fastener, the second fastener, and a bracket configured to connect to the vehicle. The bracket includes an aperture, a first slot having a closed perimeter except for a first opening at a back of the first slot, and a second slot having a closed perimeter except for a second opening at a back of the second slot. The first fastener extends vertically through the second section and into the aperture to thereby connect the recovery hook to the bracket. The second fastener extends horizontally through the first slot, through the second through hole, and into the second slot to thereby connect the recovery hook to the bracket.

The recovery hook assembly may be included as part of a vehicle, which may include a frame/chassis, and the bracket is connected to the chassis.

According to another aspect, a recovery hook for a vehicle includes a ring portion and a base portion. The ring portion includes a first through hole arranged at a front of the recovery hook. The first through hole includes a first section configured to connect with a towing apparatus for towing the vehicle, and a second section having a front opening that opens into the first section, and configured to accept a first fastener inserted therethrough for connecting the recovery hook to the vehicle. The base portion includes a second through hole arranged at a back of the recovery hook and configured to accept a second fastener inserted therethrough for connecting the recovery hook to the vehicle. A mounting bracket is connected to the base portion. The mounting bracket includes a third through hole configured to accept a third fastener inserted therethrough for connecting the recovery hook to the vehicle.

BRIEF DESCRIPTION OF THE DRAWINGS

FIG. 8 is a top view of the recovery hook of FIG. 5.

FIG. 9 is a section view of the recovery hook of FIG. 6 along line 9-9.

FIG. 10 is a section view of the recovery hook of FIG. 6 along line 10-10.

DETAILED DESCRIPTION

Figure 1:
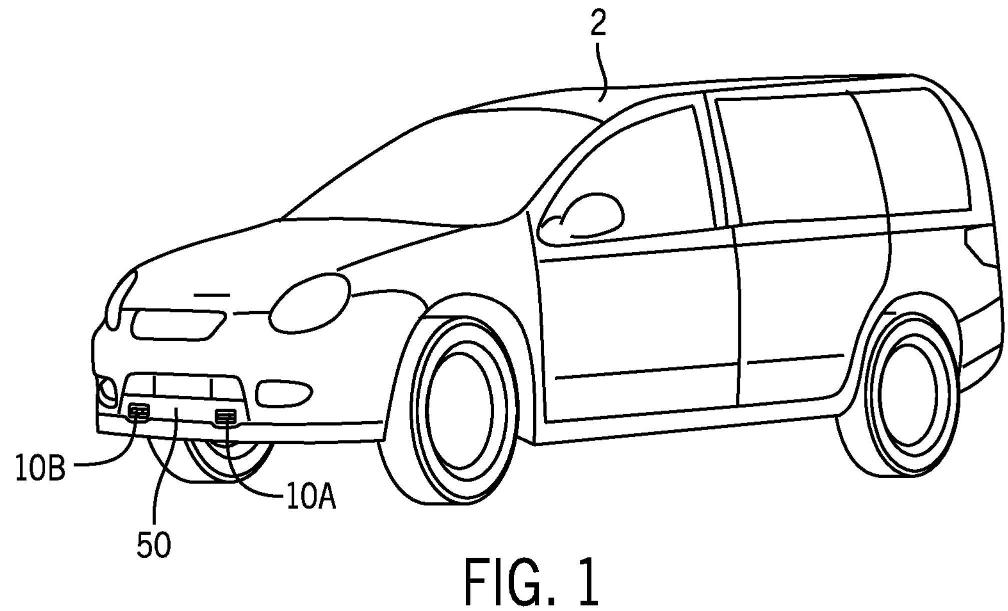
FIG. 1 is a front perspective view of a vehicle including a recovery hook assembly according to the present subject matter.

The present subject matter provides a recovery hook assembly where a recovery hook is fastened to the vehicle by a vertically oriented fastener and a horizontally oriented fastener, which connect the recovery hook to the vehicle at three connection points. When the recovery hook is pulled in the forward direction, e.g., when being towed, the recovery hook remains attached to the vehicle to allow the vehicle to be towed. However, when the recovery hook is pushed in a rearward direction, e.g., in a front collisions with another vehicle, the recovery hook can break away from the vehicle, thus inhibiting the recovery hook from causing damage to the other vehicle that is pushing it in the rearward direction.

Referring to the figures, a vehicle 2 includes a recovery hook assembly 4. In describing the vehicle 2 and recovery hook assembly 4, various directional indicators are used herein to denote the arrangement of components, including "front," "back," "top," "bottom," "right," "left" and cognate terms, and these directional indicators are made in reference to the vehicle 2 and to the recovery hook assembly 4 as attached to the vehicle 2, including for example, wherein "left" indicates the side of the vehicle 2 that is on the left when one is facing forward, i.e. a driver's side of the vehicle 2 in the United States or a starboard side of the vehicle 2, and wherein "right" indicates the side of the vehicle 2 that is on the right when one is facing forward, i.e. the passenger's side of the vehicle 2 in the United States or a port side of the vehicle 2.

The recovery hook assembly 4 is mounted at the front of the vehicle 2, on a frame 6 of the vehicle 2. The frame 6 may be a chassis or a unibody frame. The recovery hook assembly 4 includes a bracket 8 connected to the frame 6, a recovery hook 10 fastened on the bracket 8 with a vertically oriented first fastener 12 and a horizontally oriented second fastener 14. As used herein, the term "vertical" and cognate terms means straight up-and-down (i.e., plumb, 90° slope) as well as other orientations diverging by up to 30° from straight up-and-down. As used herein, the term "horizontal" and cognate terms means completely level with no slope (i.e., 0° slope) as well as other orientations diverging by up to 30° from completely level.

The bracket 8 is mounted on the bottom of a subframe 16 member of the frame 6, and the recovery hook 10 is mounted to the bracket 8 via the first and second fasteners 12, 14 at three contact/connection points P1, P2, P3 as discussed in more detail herein.

The recovery hook 10 can be used for connecting a towing apparatus 18 to the vehicle 2 for moving the vehicle 2 when it is immobile. The recovery hook 10 is rigidly secured to the vehicle 2 when subject to a forward pulling force (i.e. a force pulling in a forward direction), and thus allows the towing apparatus 18 to pull the vehicle 2 in a forward direction. However, as explained in more detain herein, when the recovery hook 10 is subject to a rearward pushing force (i.e. a force pushing in a rearward direction) that is greater than a predetermined magnitude, such as in a head-on collision between the vehicle 2 and another vehicle, the recovery hook 10 can break away from the bracket 8, and thus may provide similar crash performance as a similar vehicle without a recovery hook assembly 4. If the rearward pushing force does not exceed the predetermined magnitude, then the recovery hook 10 may remain attached to the bracket 8.

Figure 2:
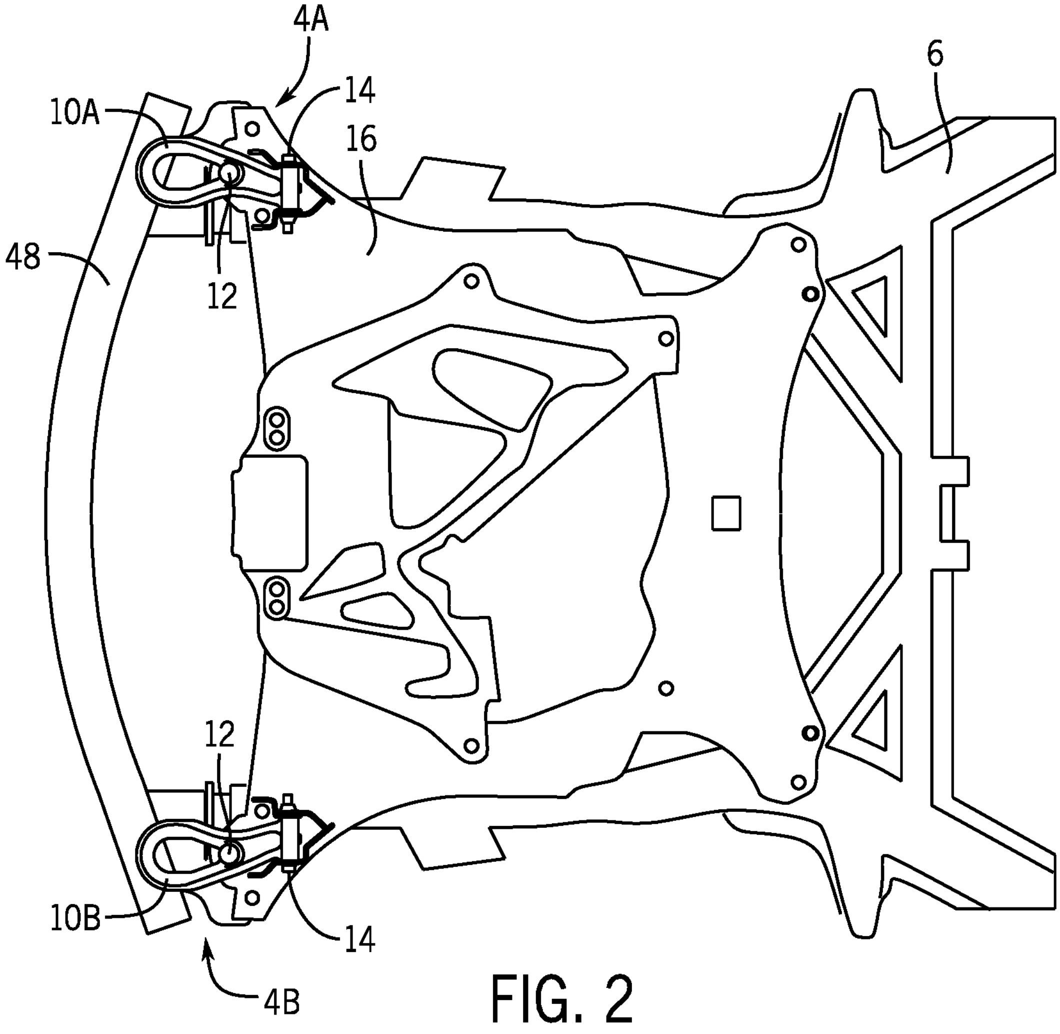
FIG. 2 is a bottom view of a vehicle frame including a recovery hook assembly according to the present subject matter.
Figure 3:
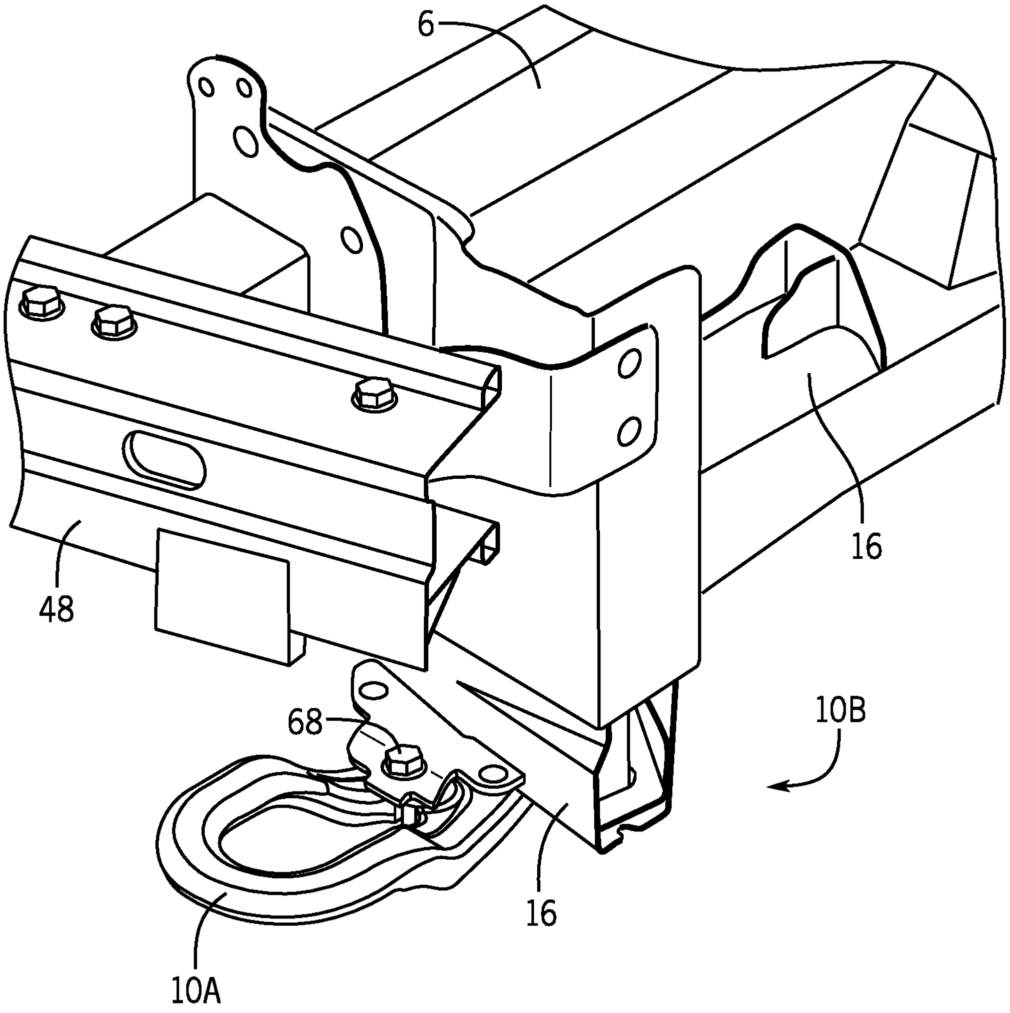
FIG. 3 is a top left perspective view of a portion of the vehicle frame of FIG. 2.
Figure 4:
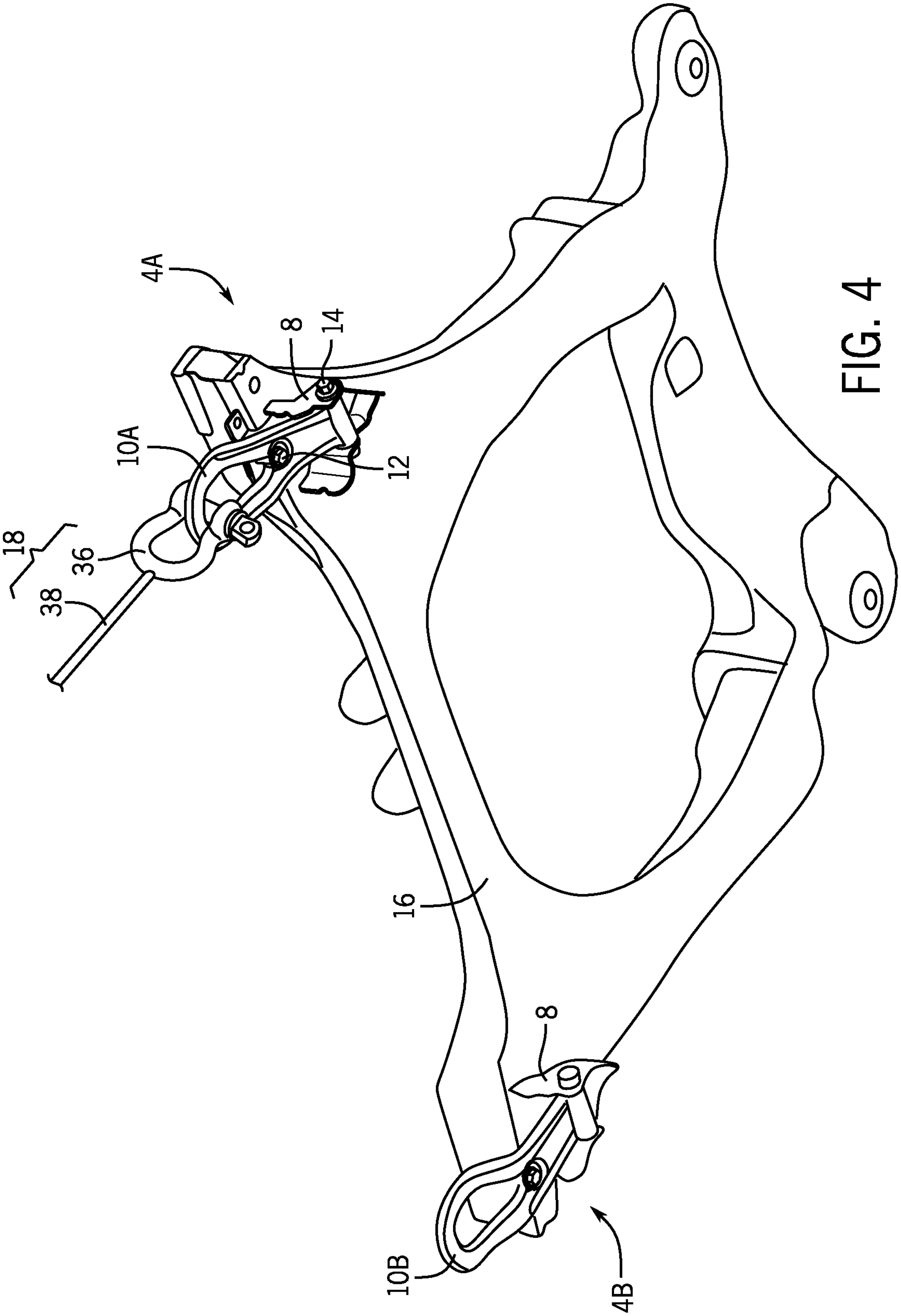
FIG. 4 is a bottom left perspective view of a recovery hook assembly on a subframe according to the present subject matter.

The vehicle 2 may include two, or more, recovery hook assemblies 4 at a front of the vehicle 2. This is shown in FIGS. 1, 2, and 4 for example, which show a left front recovery hook assembly 4A and a right front recovery hook assembly 4B, which may be mirror images of each other. The following description discusses the features of the recovery hook assembly 4 as embodied by the left front recovery hook assembly 4A with a left recovery hook 10A, but it will be appreciated that the right front recovery hook assembly 4B with a right recovery hook 10B may have the same features, but just in a mirror image form. It will also be appreciated that the present subject matter includes one or more recovery hook assemblies 4 being mounted on a back of the vehicle 2 to pull the vehicle in a backward direction, and/or on a left or a right side of the vehicle 2 to pull the vehicle in a sideways direction.

Vehicle

The vehicle 2 is not particularly limited, and may include an automobile such as a truck, car, or SUV, or other vehicle such as a plane, boat, train, scooter, motorcycle, or even a non-motorized vehicle. The recovery hook assembly 4, including the bracket 8, the recovery hook 10, and the first and second fasteners 12, 14, can be connected to any of these vehicles 2. In a non-limiting example, the recovery hook assembly 4 is connected to the frame/chassis 6 of an automobile so as to allow a towing apparatus 18 to connect to and tow the automobile.

The frame 6 of the vehicle 2 may be a frame 6 including the subframe 16 and a bumper beam 48. However, this is not required. The subframe 16 is arranged at the bottom front of the frame 6, and may be arranged under the bumper beam 48. The recovery hook assembly 4 may be mounted on the bottom of the subframe 16, and thus may be arranged below the bumper beam 48. The recovery hook 10 may project out in front of the bracket 8, the subframe 16, and a front body panel 50, and may be visible and freely accessible from the front of the vehicle 2 for towing the vehicle 2 as shown in FIG. 1.

Recovery Hook

The recovery hook assembly 4 includes the recovery hook 10, which is mounted on the front of vehicle 2 via the bracket 8. The recovery hook 10 may be a one-piece construction including a ring portion 20 at its front and directed towards the front of the vehicle 2 when mounted on the vehicle 2, and a base portion 22 at its back and directed towards the back of the vehicle 2 when mounted on the vehicle 2. The recovery hook 10 is an elongated structure having a length extending from the front of the recovery hook 10 to the back of the recovery hook 10 along the longitudinal axis L.

In a side view (FIG. 7), the recovery hook 10 may have a step-like configuration, with a front elevated portion 74, a rear lowered portion 76, and a middle sloped portion 78 connecting the two. This is not required, and the recovery hook 10 could have a flat configuration is side view.

The one-piece recovery hook 10 may be a cast component, a stamped component, a forged component, a milled component, an additively manufactured component, or another one-piece component. However, this is not required and the recovery hook 10 could be formed from multiple pieces rigidly connected together by welding, fasteners, etc. The material of the recovery hook 10 is not particularly limited and may include metals, polymers, ceramics, glass, etc., and combinations or composites thereof including various fillers and additives. Whether one-piece or multi-piece, the recovery hook 10 is rigid and may be free of articulating joints or movable parts. In a non-limiting aspect, the recovery hook 10 is a cast one-piece rigid metal construction including the ring portion 20 and the base portion 22.

The ring portion 20 of the recovery hook 10 includes a central first through hole 24 arranged at a front of the recovery hook 10 and extending vertically through the recovery hook 10 between a top surface 26 and a bottom surface 28 of the recovery hook 10. The first through hole 24 may axially extend along the longitudinal axis L of the recovery hook 10 from the front elevated portion 74, through the middle sloped portion 78, and into the rear lowered portion 76 where it terminates.

Figure 6:
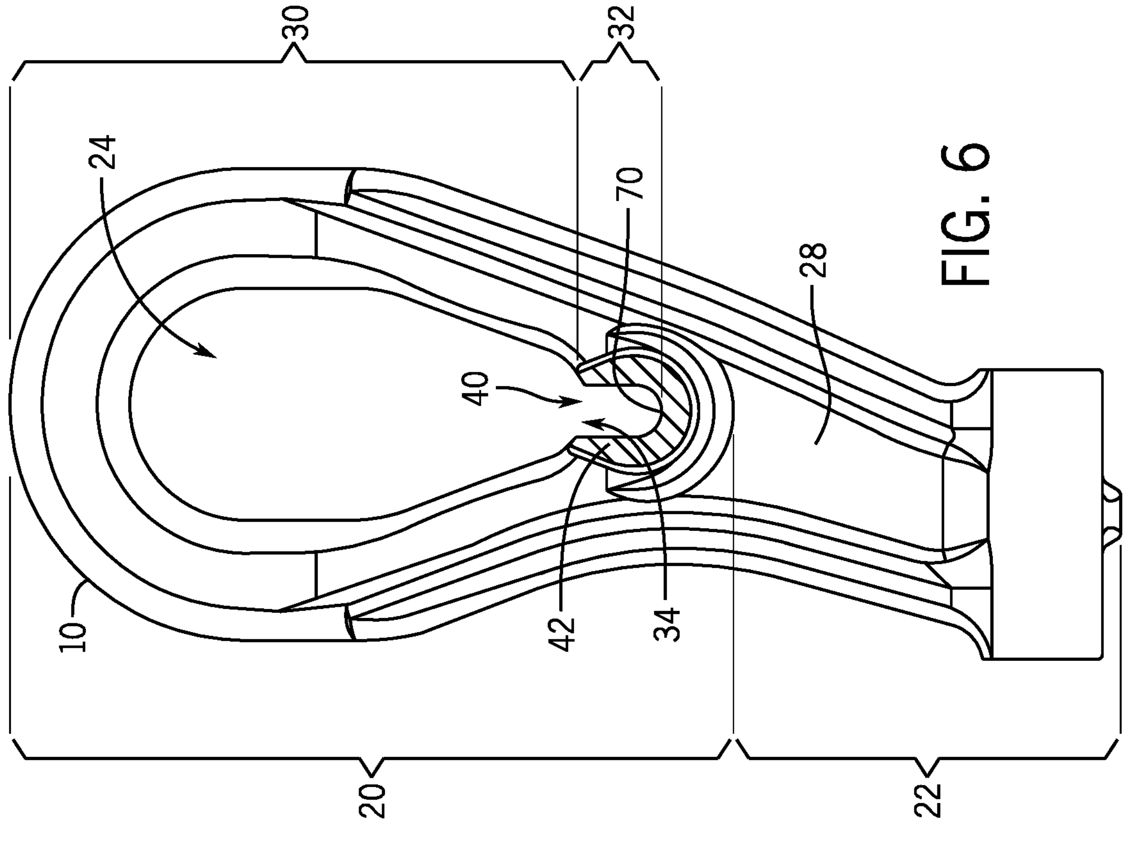
FIG. 6 is a bottom view of the recovery hook of FIG. 5.
Figure 11:
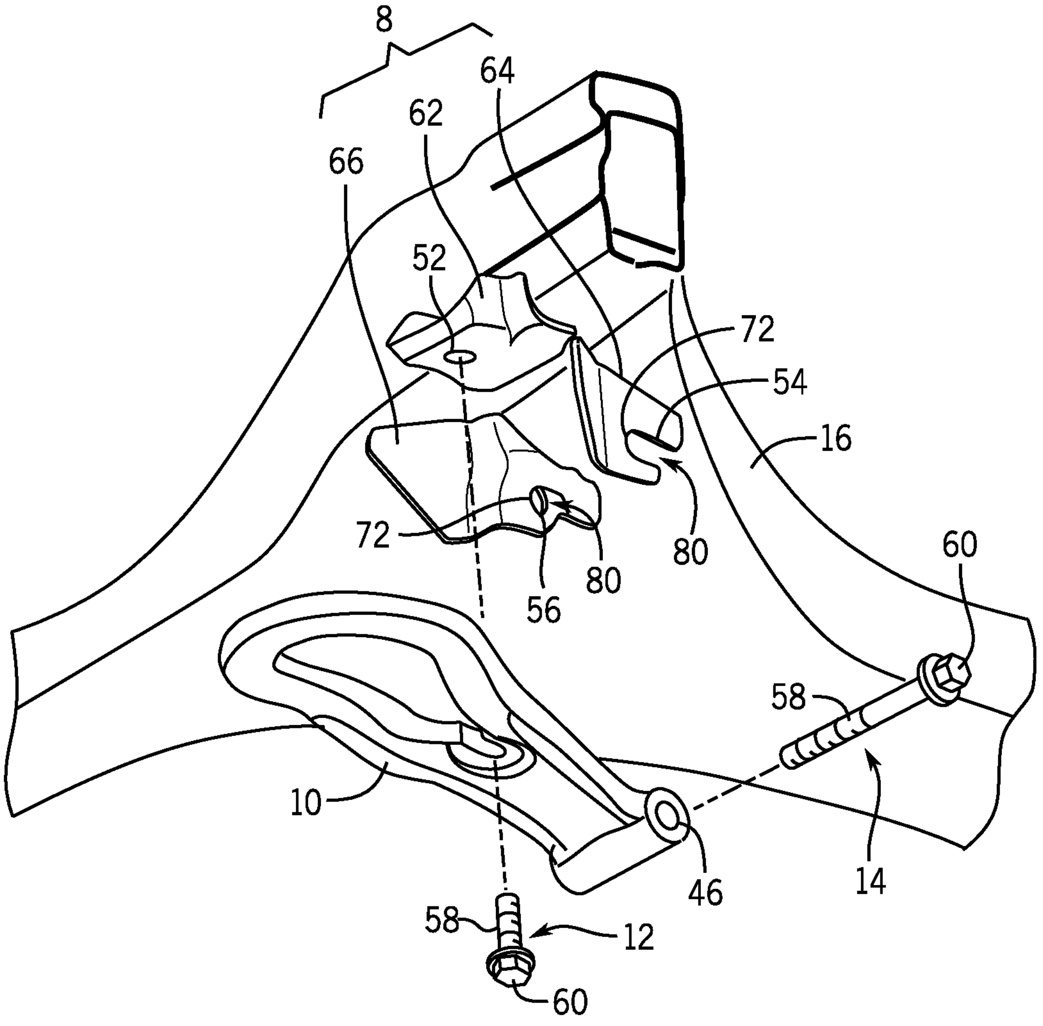
FIG. 11 is an exploded view of the recovery hook assembly and the subframe of FIG. 4.

The first through hole 24 may be symmetrical around the longitudinal axis L of the recovery hook 10 as shown in FIGS. 6 and 8. The longitudinal axis L of the recovery hook 10 extends from the front to the back of the recovery hook 10, and extends through a center of the first through hole 24 to divide the first through hole 24 into two equal halves, one on the right side and one on the left side of the longitudinal axis L, the two halves having the same shape and area and being mirror images of each other. However, this is not required, and the first through hole 24 may be asymmetrically shaped or spaced around the longitudinal axis L.

The first through hole 24 may have a completely closed perimeter as shown in the figures. However, this is not required, and the recovery hook 10 could include a hook portion having a central through hole with an opening in the perimeter.

The first through hole 24 includes a first section 30 configured to connect with the towing apparatus 18 for towing the vehicle 2. This is shown in FIG. 4, for example, where the towing apparatus 18, including a D-ring shackle 36 and tow line 38, is connected to the first section 30 by the D-ring shackle 36 being inserted through the first section 30 of the first through hole 24. The first section 30 thus may be sized so as to allow such a connection with the D-ring shackle 36, i.e. to allow the D-ring shackle 36 to be inserted through the first section 30. The towing apparatus 18, which may also include a pulling mechanism (not shown) such as another vehicle, a winch, crank, etc. connected to the other end of the tow line 38, can be used to pull the vehicle 2 via the recovery hook 10.

The first through hole 24 also includes a second section 32 that is smaller than the first section 30. The second section 32 is arranged at a back of the first section 30 and at a back of the first through hole 24, while the first section 30 is arranged at a front of the second section 32 and at a front of the first through hole 24. The second section 32 is configured to accept the first fastener 12 inserted vertically up through the second section 32 for connecting with the bracket 8 and thus to the vehicle 2. The second section 32 is in the form of a u-shaped slot, which is a vertical through hole having a closed perimeter except for a front opening 34 that opens into the first section 30. Congruently, the first section 30 has a closed perimeter except for a back opening 40 that is coextensive with the front opening 34 of the second section, and the back opening 40 opens into the second section 32. The first section 30 and the second section 32 are thus contiguous at the openings 34, 40. As discussed in detail herein, this front opening 34 and back opening 40 allow a shaft 58 of the first fastener 12 to escape from the second section 32 into the first section 30 when the recovery hook 10 is subject to a rearward pushing force having a magnitude that exceeds a predetermined threshold. The coextensive openings 34, 40 between the first and second sections 30, 32 provide a horizontal path that allows the shaft 58 of the first fastener 12 to pass horizontally from the second section 32 into the first section 30 upon application of the backward pushing force to the recovery hook 10.

Figure 12:
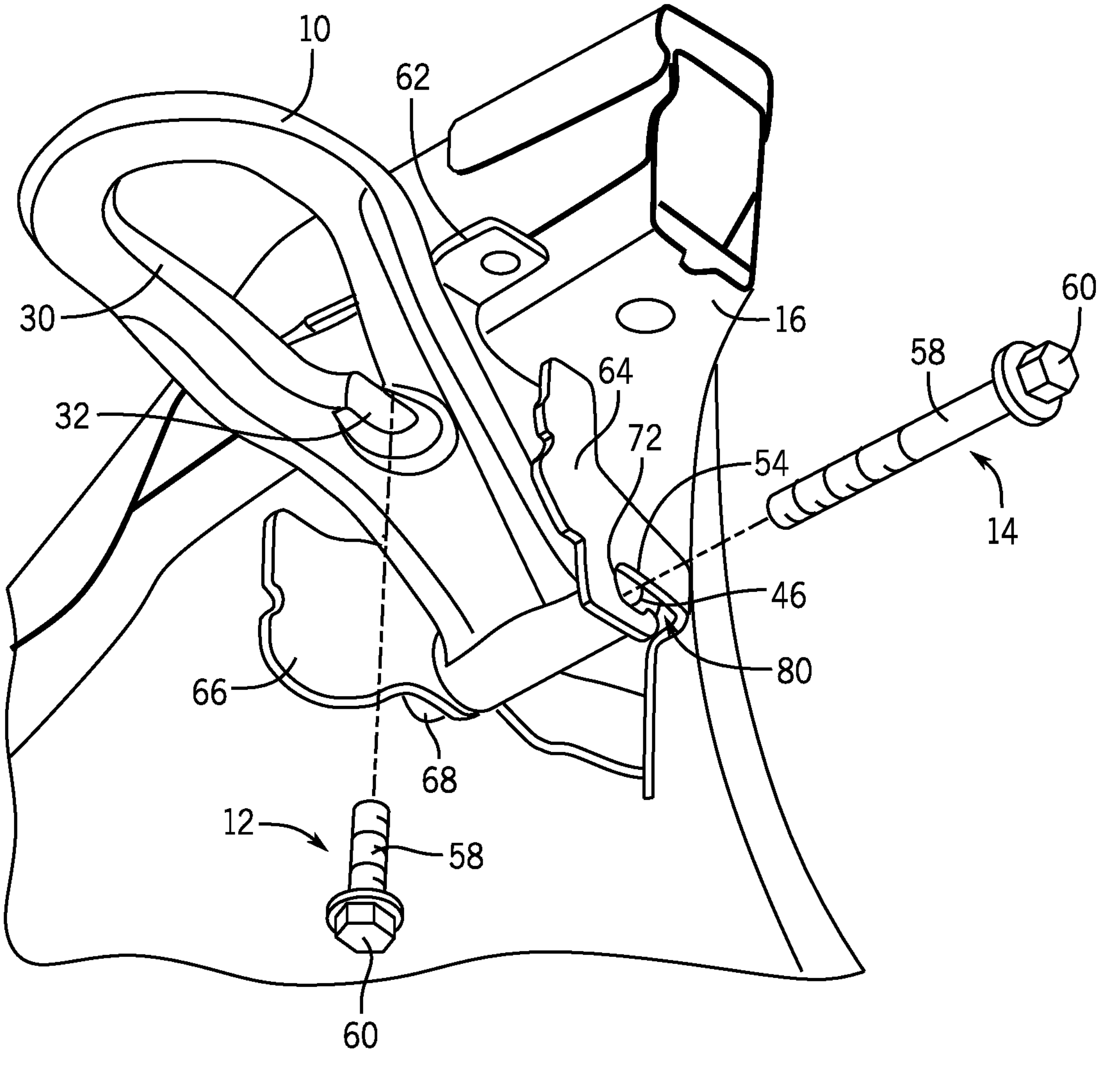
FIG. 12 is a bottom left perspective view of a recovery hook being mounted on a vehicle frame using two fasteners according to the present subject matter.
Figure 13:
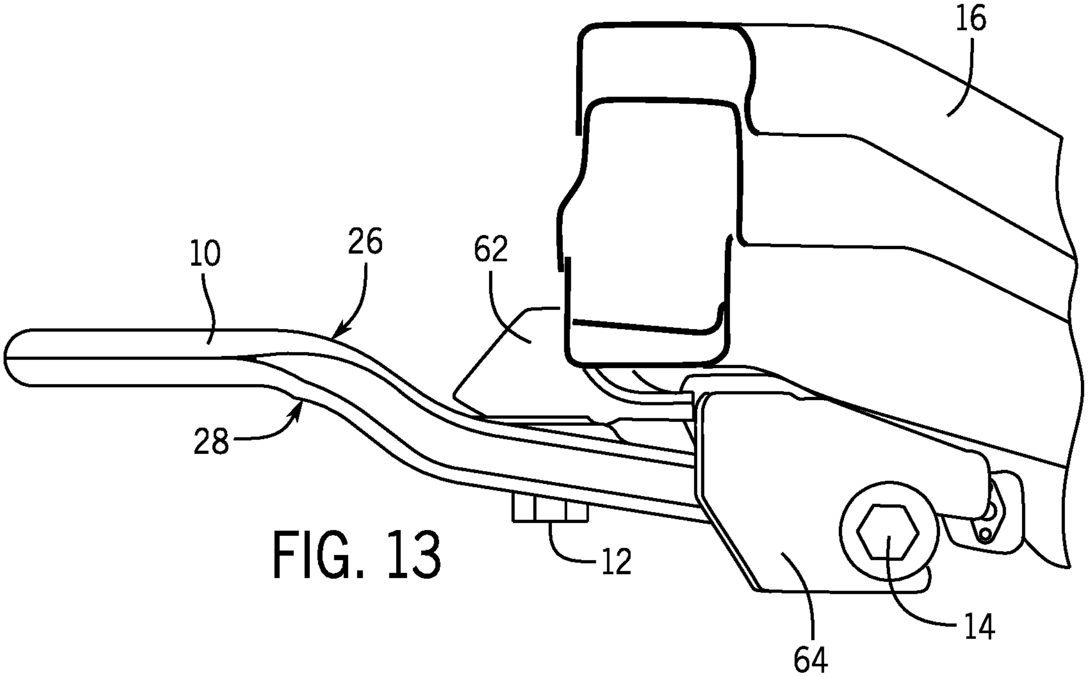
FIG. 13 is a side view of the recovery hook assembly and the subframe of FIG. 4.
Figure 14:
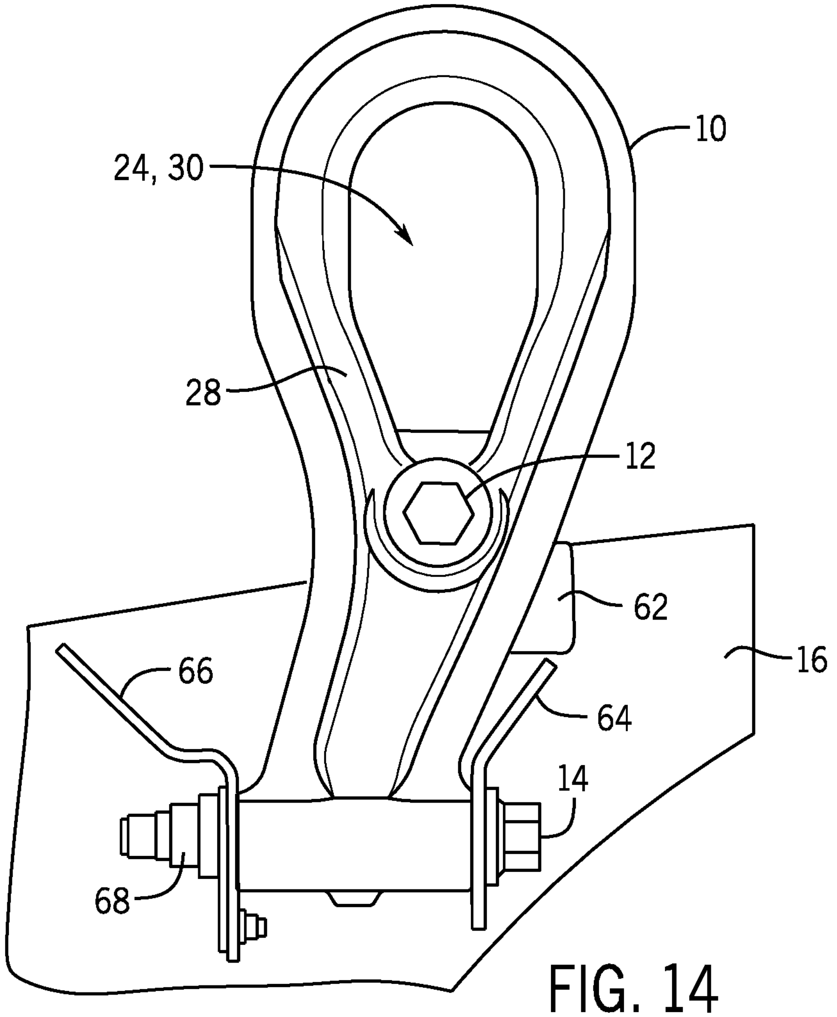
FIG. 14 is a bottom view of the recovery hook assembly and the subframe of FIG. 4.
Figure 15:
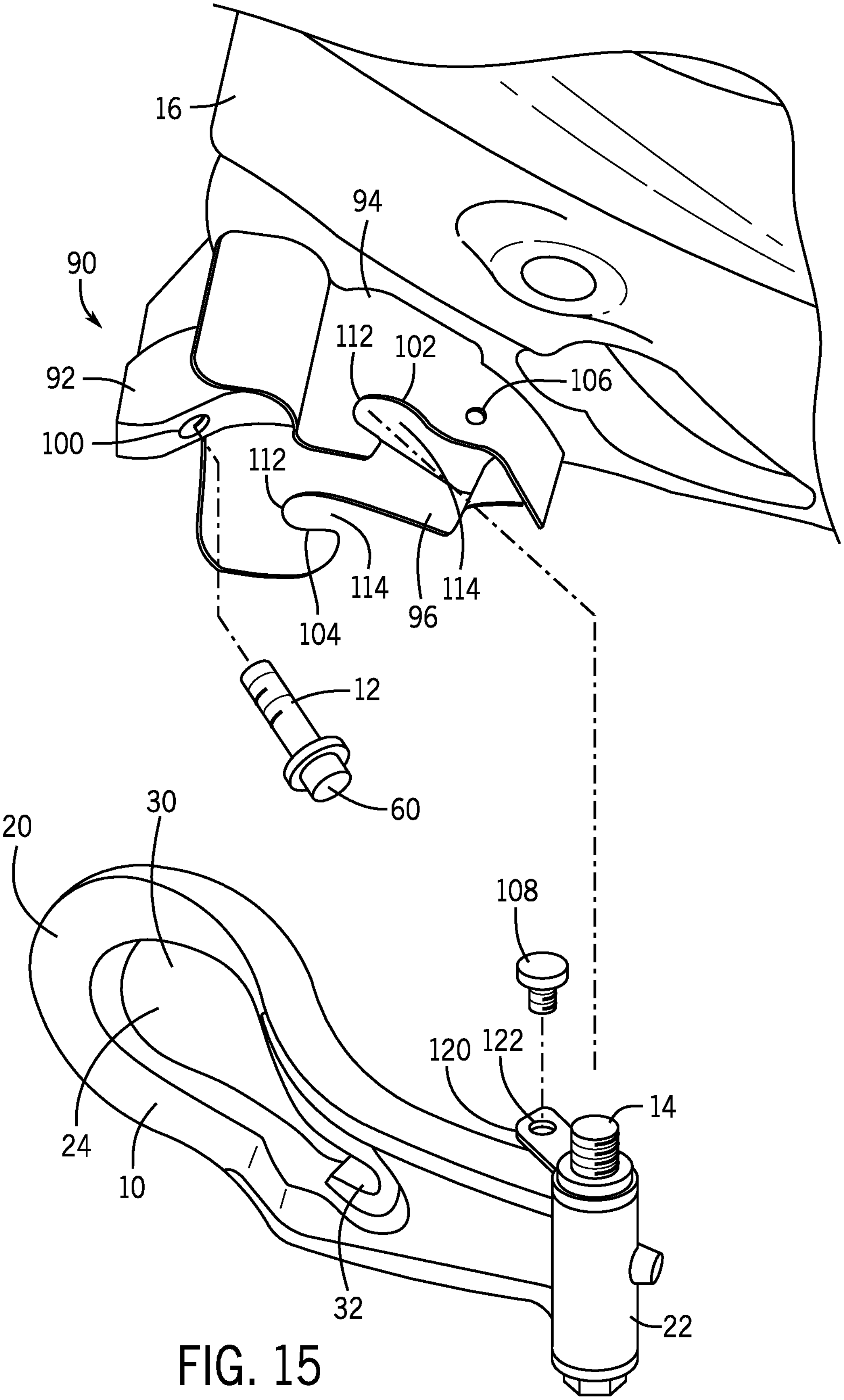
FIG. 15 is an exploded view of the recovery hook assembly and the subframe of FIG. 4 according to another aspect of the present subject matter.

The ring portion 20 includes a recessed flat surface 42 surrounding the second section 32 on a bottom side 28 of the recovery hook 10 as shown in FIGS. 9 and 12, which is recessed into the surrounding bottom surface 28 of the recovery hook 10 around the recessed flat surface 42. In other words, the portion of the bottom surface 28 that surrounds the recessed flat surface 42 stands proud of the recessed flat surface 42. As described in more detail herein, the recessed flat surface 42 accepts a head of the first fastener 12 when the first fastener 12 is inserted through the second section 32 to connect the recovery hook 10 to the vehicle 2.

Figure 5:
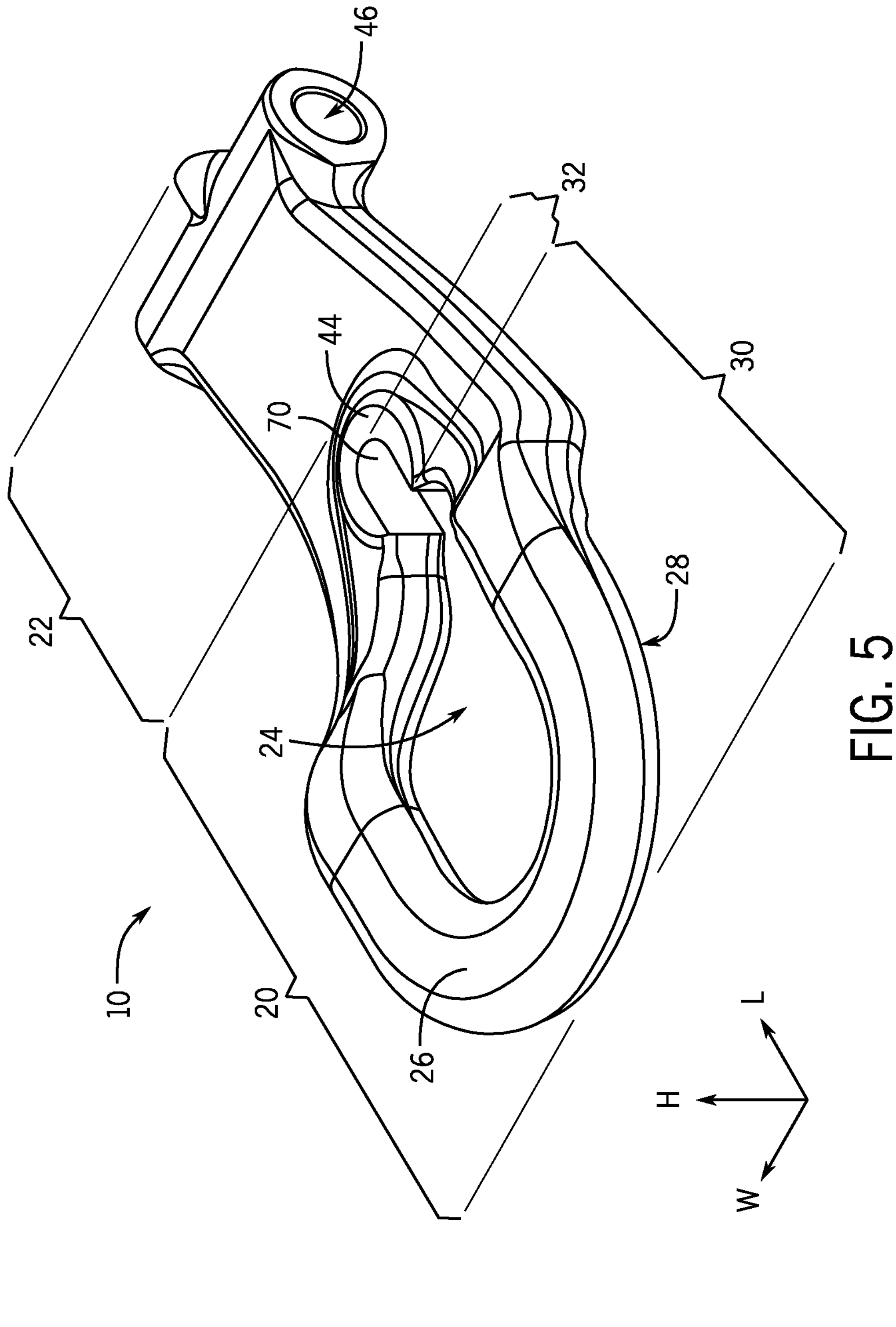
FIG. 5 is a top left perspective view of a recovery hook according to the present subject matter.
Figure 7:
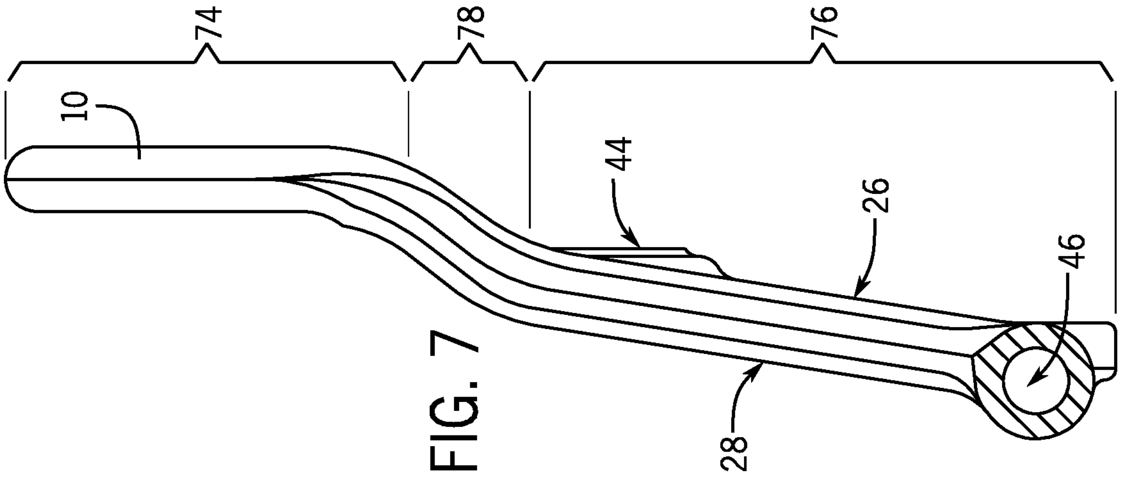
FIG. 7 is a left side view of the recovery hook of FIG. 5.

The ring portion 20 further includes a projecting flat surface 44 surrounding the second section 32 on a top side 26 of the recovery hook 10 as shown in FIGS. 5, 7, and 9, which projects up away from the surrounding top surface 26 of the recovery hook 10 around the projecting flat surface 44. In other words, the projecting flat surface 44 stands proud of the portion of the top surface 26 that surrounds the projecting flat surface 44. As described in more detail herein, the projecting flat surface 77 contacts a bottom mounting surface of the bracket 8.

The base portion 22 of the recovery hook 10 is arranged behind the ring portion 20, and includes a second through hole 46 arranged at a back of the recovery hook 10 and extending horizontally through the base portion 22 of the recovery hook 10 between the left and right sides of the recovery hook 10. The second through hole 46 is arranged within the rear lowered portion 76.

The second through hole 46 is configured to accept a second fastener 14 inserted side-to-side (e.g. horizontally oriented) through the second through hole 46 for connecting with the bracket 8 and thus to the vehicle 2. The second through hole 46 is in the form of an elongated horizontal closed straight tunnel having a length greater than its radius with an opening at either end, and is formed by a tube-shaped part of the base portion 22. The second through hole 46 may extend straight through the recovery hook 10 in a horizontal direction that is perpendicular to the vertical direction in which the first through hole 24 extends straight through the recovery hook 10, and may be perpendicular to the longitudinal axis L of the recovery hook 10.

The second through hole 46 may be laterally offset to the right from the longitudinal axis L of the recovery hook 10 as shown in the figures, or to left. However, this is not required, and the second through hole 46 may be centered on the longitudinal axis L.

Fasteners

The fasteners 12, 14 are not particularly limited, and may include bolts including washer bolts, nuts, screws including flow screws, pins, rivets, other fasteners, and combinations thereof. In a non-limiting aspect, the fasteners 12, 14 are washer bolts as depicted in the figures, with straight elongated shafts 58 and a washer head 60 having a diameter larger than that of the shaft 58.

The first fastener 12 is vertically oriented when connecting the recovery hook 10 to the bracket 8, and the second fastener 14 is horizontally oriented when connecting the recovery hook 10 to the bracket 8.

When the first fastener 12 is inserted vertically up through the second section 32, a diameter of the shaft 58 of the first fastener 12 may be smaller than the size of the second section 32, and thus the shaft 58 may pass vertically through the second section 32 so as to connect with the bracket 8. A head 60 of the first fastener 12 has a lateral dimension (i.e. dimension perpendicular to a longitudinal axis of the fastener, e.g. a diameter of the head 60) larger than the size of the second section 32 so as to prevent the head 60 from passing vertically up through the second section 32. However, the head 60 of the first fastener 12 is smaller than the size of the first section 30, which allows the first fastener 12 to freely move vertically through the first section 30 when the shaft 58 of the first fastener 12 escapes from the second section 32 into the first section 30.

The shaft 58 of the second fastener 14 has a lateral dimension (i.e. a dimension perpendicular to a longitudinal axis of the fastener, e.g. a diameter of the shaft 58) that is smaller than the size of the second through hole 46 and smaller than the size of the first and second slots 54, 56 of the bracket 8 (discussed in more detail herein), thus allowing the shaft 58 to be inserted through the second through hole 46 and first and second slots 54, 56 of the bracket 8. The head 60 of the second fastener 14 has a larger lateral dimension than the diameter of the second through hole 46 so as to prevent the head 60 from passing horizontally through the second through hole 46, and larger than the size of the first and second slots 54, 56, and thus the head 60 does not pass horizontally through the first and second slots 54, 56.

Bracket

The bracket 8 is connected directly to a bottom of the subframe 16 member, and thus to the bottom of the frame 6 of which the subframe 16 is a part. The bracket 8 may be connected (e.g. directly connected) to the subframe 16 by various methods and combinations thereof, including welding, integral formation with the subframe 16, mechanical connections, etc. The bracket 8 may have a top portion 62, a left portion 64, and a right portion 66. Additional portions may be included in the bracket 8. The three portions 62, 64, 66, as well as any additional portions, may be separate pieces, or may be parts of a one-piece bracket 8. The bracket 8 may be stamped, forged, cast, additively manufactured, or produced both other methods, and may be any material including metal, polymer, ceramics, glass, etc., or combinations thereof.

The bracket 8 includes an aperture 52 for connecting the first fastener 12 to the bracket 8, and a first slot 54 and a second slot 56 for connecting the second fastener 14 to the bracket 8.

The aperture 52 of the bracket 8 extends vertically up through the top portion 62 of the bracket 8 from a bottom surface of the top portion 62 to a top surface of the top portion 62, and the aperture 52 is configured to accept the vertically oriented first fastener 12, which is already inserted through the second section 32, so as to connect the recovery hook 10 to the bracket 8. The aperture 52 may be threaded so that a threaded shaft 58 of the first fastener 12 can be threaded directly to the threaded aperture 52, thus pinching/compressing the recovery hook 10 between the bracket 8 and the head 60 of the first fastener 12. Alternatively, the aperture 52 may be unthreaded to allow the threaded shaft 58 of the first fastener 12 to pass therethrough and connect to a threaded nut (not shown) at a top of the bracket 8. In either event, the head 60 of the first fastener 12 contacts and exerts an upward force on a bottom of the recovery hook 10. The bracket 8, because of its own thread or that of the threaded nut, exerts a downward force on the top of the recovery hook 10. This results in the recovery hook 10 being pinched/compressed between the head 60 of the first fastener 12 and the bracket 8, and thus secured to the bracket 8. Alternatively, the first fastener 12 may be connected to the top portion 62 by riveting, welding, or with other mechanical attachments so as to compress the recovery hook 10 between the head 60 of the first fastener 12 and the bracket 8.

The first slot 54 of the bracket 8 extends horizontally through a left portion 64 of the bracket 8 from a right surface of the left portion 64 to a left surface of the left portion 64. The second slot 56 of the bracket 8 extends horizontally through a right portion 66 of the bracket 8 from a right surface of the right portion 66 to a left surface of the right portion 66. The first and second slots 54, 56 are U-shaped horizontal through holes having a closed perimeter with a closed front wall 72 except for an opening 80 at the back that opens toward a back of the bracket 8. The first and second slots 54, 56 may each have a slight downward angle going from their front to their back. The first and second slots 54, 56 may be horizontally aligned with each other.

The first and second slots 54, 56 are configured to accept the horizontally oriented second fastener 14 to connect the recovery hook 10 to the bracket 8. A head 60 of the second fastener 14 has a lateral dimension (i.e. a dimension perpendicular to the longitudinal axis of the fastener, e.g. a diameter of the head 60) that is larger than the size of the first and second slots 54, 56, and thus the head 60 does not pass horizontally through the first and second slots 54, 56. A lateral dimension of the shaft 58 of the second fastener 14 (i.e. a dimension perpendicular to the longitudinal axis of the fastener, e.g. a diameter of the of the shaft 58) is smaller than the size of the first and second slots 54, 56, and thus the shaft 58 does pass horizontally through the first and second slots 54, 56. The shaft 58 of the second fastener 14 may be threaded, and thus can be threaded to a threaded nut 68 at a right side of the right portion 66, thus pinching the left portion 64, the base portion 22, and the right portion 66 between the head 60 of the second fastener 14 and the nut 68. Alternatively, the second fastener 14 may be connected to the bracket 8 by riveting the second fastener 14, using a lock ring on the second fastener 14, or with other mechanical attachments.

When connected to the bracket 8, the projecting flat surface 44 around the second section 32 of the first through hole 24 contacts a flat bottom surface of the top portion 62 of the bracket 8, thus defining the first connection point P1; the left side of the base portion 22 around the second through hole 46 contacts a right surface of the left potion 64 of the bracket 8, thus defining the second contact point P2; and the right side of the base portion 22 around the second through hole 46 contacts a left surface of the right portion 66 of the bracket 8, thus defining the third contact point P3. The recovery hook 10 is thus connected to the bracket 8 at three connection points P1, P2, P3.

Alternative Bracket

FIGS. 15-18 depict an alternative bracket 90 for mounting the recovery hook 10 to a bottom of the subframe 16 member, and thus to the bottom of the frame 6. The bracket 90 is similar to the bracket 8 described above, and may be connected (e.g. directly connected) to the subframe 16 by various methods and combinations. The bracket 90 may have a top portion 92, a left portion 94, and a right portion 96. Additional portions may be included in the bracket 90. The three portions 92, 94, 96, as well as any additional portions, may be separate pieces, or may be parts of a one-piece bracket 90.

The bracket 90 includes a first aperture 100 for connecting the first fastener 12 to the bracket 90, and a first slot 102 and a second slot 104 for connecting the second fastener 14 to the bracket 90. The bracket 90, particularly the left portion 94, includes a second aperture 106 for connecting a third fastener 108 to the bracket. In a non-limiting aspect, the third fastener 108 is a bolt depicted in the figures, but may include washer bolts, nuts, screws including flow screws, pins, rivets, other fasteners, and combinations thereof.

The first aperture 100 may be threaded so that the first fastener 12 can be threaded directly to the threaded aperture 100, thus pinching/compressing the recovery hook 10 between the bracket 90 and the head 60 of the first fastener 12. Although, this is not required. Similar to the mounting of the bracket 8, the recovery hook 10 is pinched/compressed between the head 60 of the first fastener 12 and the bracket 90, and thus secured to the bracket 90.

The first and second slots 102, 104 are U-shaped horizontal through holes having a closed perimeter with a closed front wall 112 except for an opening 114 at the back that opens toward a back of the bracket 90. The first and second slots 102, 104 are configured to accept the second fastener 14 to connect the recovery hook 10 to the bracket 90. The second fastener 14 may be threaded, and thus can be threaded to the threaded nut 68 (FIG. 18) at a right side of the right portion 96, thus pinching the left portion 94, the base portion 92, and the right portion 96 between the head 60 of the second fastener 14 and the nut 68. Alternatively, the second fastener 14 may be connected to the bracket 90 by other mechanical attachments.

Figure 16:
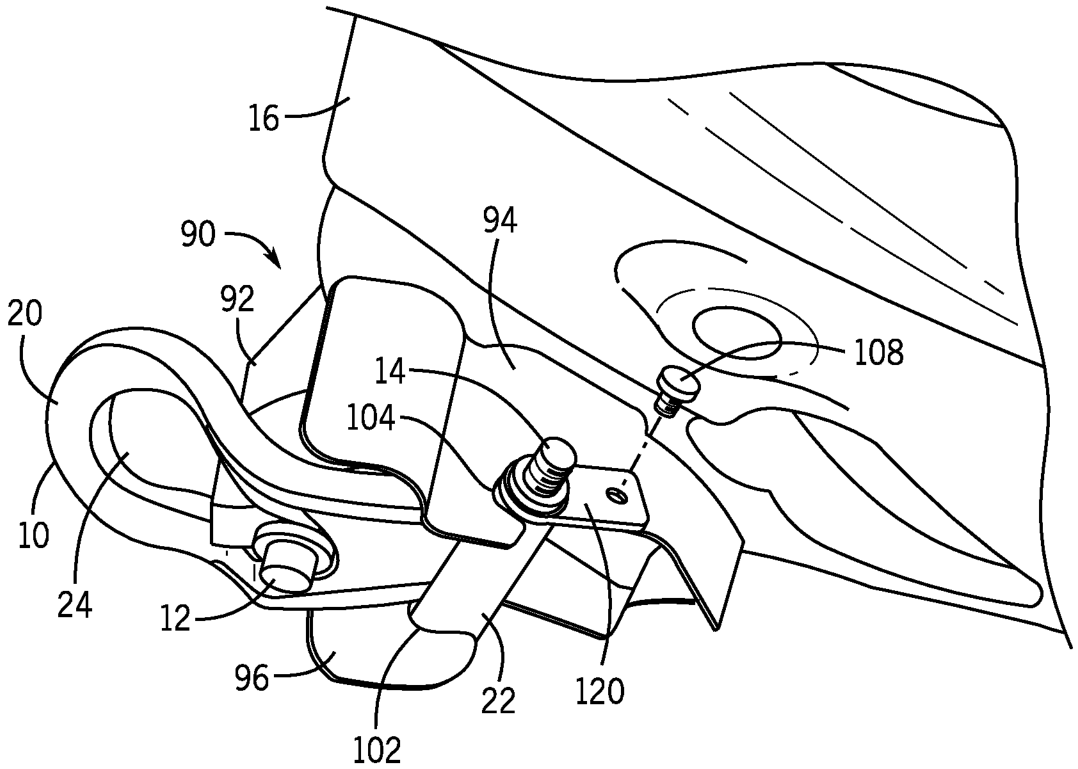
FIG. 16 is a bottom left perspective view of a recovery hook being mounted on the subframe frame using three fasteners shown in FIG. 15.
Figure 17:
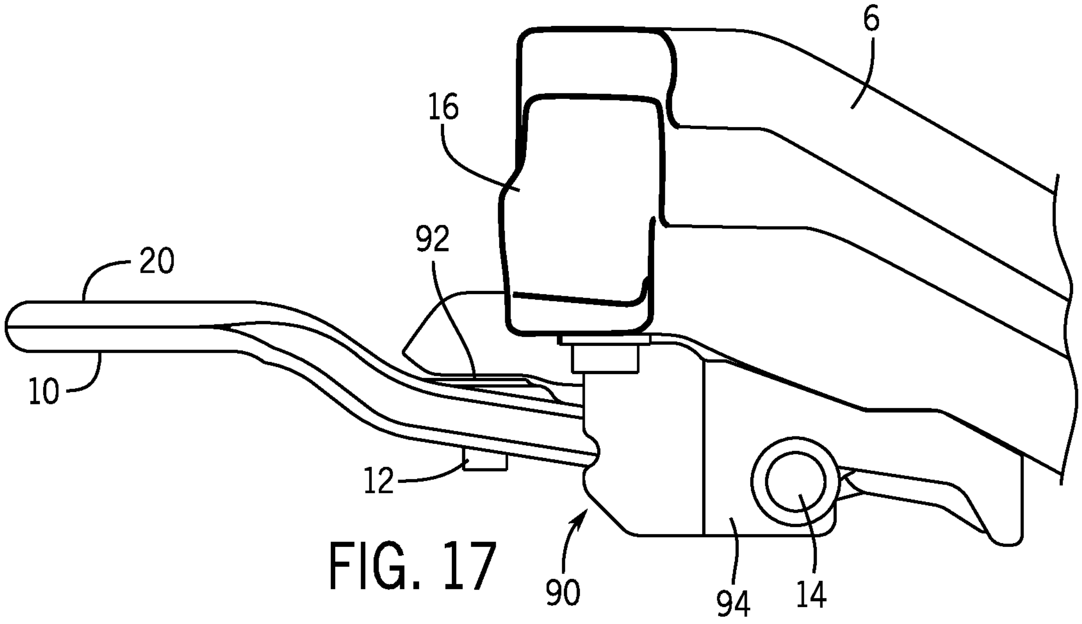
FIG. 17 is a side view of FIG. 16 after mounting the recovery hook to the subframe.
Figure 18:
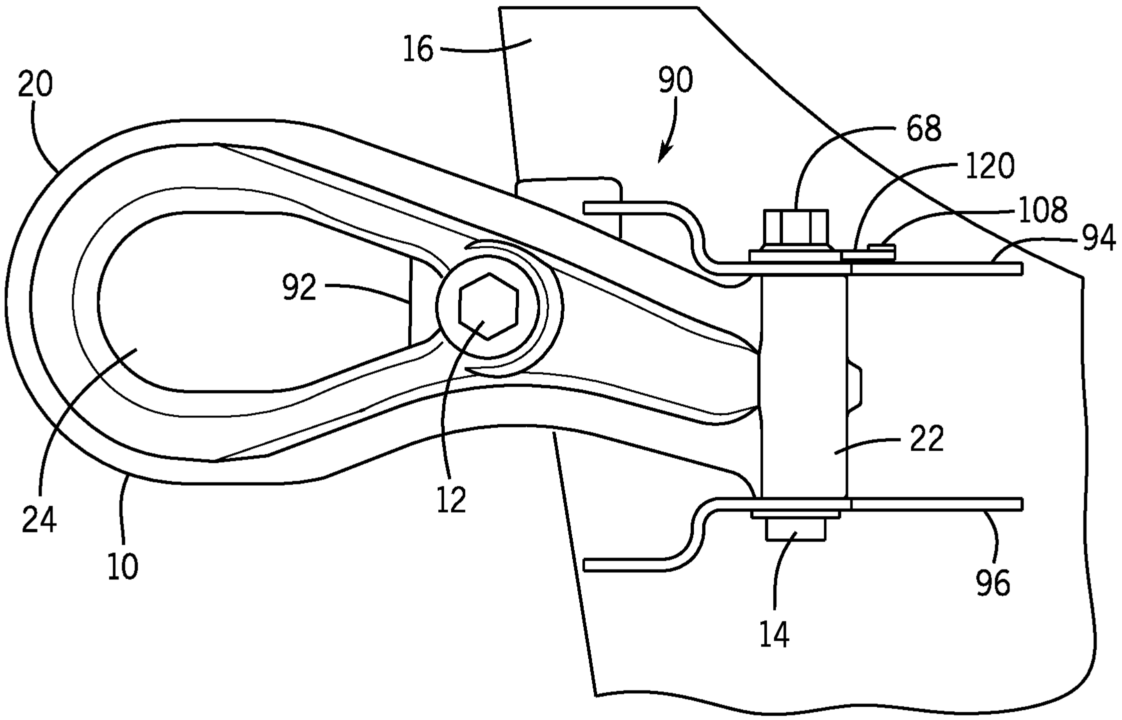
FIG. 18 is a bottom view of FIG. 17 showing the recover hook mounted to the subframe.

The third fastener 108 connects a mounting bracket 120 to the bracket 90 (see FIGS. 16 and 18). The mounting bracket 120 is connected at least one of the second fastener 14 and the base portion 22 of the recovery hook 10. By way of example, the mounting bracket 120 can be fitted over an end portion of the second fastener 14. The mounting bracket 120 includes a third through hole 122 configured to accept the third fastener 108 inserted therethrough for further connecting the recovery hook 10 to the vehicle. The second aperture 106 provided on the left portion 94 of the bracket 90 may be threaded so that the third fastener 108 can be threaded directly to the threaded second aperture 106; although, it should be appreciated that the third fastener 108 may be connected to the bracket 90 by other mechanical attachments. As depicted, the first through hole 24 extends through the ring portion 20 in a first direction, and the second through hole 46 extends through the base portion and the third through hole 122 extends through the mounting bracket 120 each in a second direction that is intersecting to the first direction. According to one aspect, the first direction is angled or canted relative to a vertical orientation and the second direction is perpendicular to a longitudinal axis of the recovery hook 10.

Towing Apparatus

The towing apparatus 18 is not particularly limited, and may include the D-ring 36, the tow line 38, or other mechanisms configured to connect to the recovery hook 10. The towing apparatus 18 may further include a pulling mechanism that exerts a forward pulling force on the recovery hook 10, and this pulling mechanism may include another vehicle, a winch, crank, or other force-producing component.

Operation

When it is desired to pull the vehicle 2, the towing apparatus 18 can be connected to the ring portion 20 of the recovery hook 10. The towing apparatus 18 can then exert a forward directed pulling force on the recovery hook 10 to pull the vehicle 2 in a forward direction.

Because the second section 32 of the first through hole 24 is U-shape and has a closed perimeter except for the front opening 34, and thus has a closed back wall 70, the forward pulling of the recovery hook 10 urges the closed back wall 70 of the second section 32 forward towards the shaft 58 of the first fastener 12, which is longitudinally secured because it is inserted into the aperture 52, 100 of the bracket 8, 90. Under such application of forward force, the closed back wall 70 can move forward until it meets the shaft 58 of the first fastener 12, at which point the shaft 58 prevents any further forward movement of the recovery hook 10 with respect to the bracket 8, 90, and thus the shaft 58 remains in the second section 32 and the first fastener 12 keeps the recovery hook 10 connected to the bracket 8, 90.

Additionally, because the first slot 54, 102 and the second slot 56, 104 are each U-shaped and have a closed perimeter except for the back opening 80, 114, and thus has the closed front wall 72, 112, the forward pulling of the recovery hook 10 urges the second fastener 14, which is longitudinally secured in the second through hole 46, forward in each of the slots towards the closed front wall. Under such application of forward force, the second fastener 14 can move forward until the shaft 58 of the second fastener 14 meets the closed front wall 72, 112 of each of the first slot 54, 102 and the second slot 56, 104, at which point the closed front wall 72, 112 prevents any further forward movement of second fastener 14 and thus any further forward movement of the recovery hook 10 with respect to the bracket 8. Consequently, the shaft 58 of the second fastener 14 remains in the slots 54, 102 and 56, 104 and the second fastener 14 keeps the recovery hook 10 connected to the bracket 8.

Regarding the bracket 8, upon application of a backward directed force on the recovery hook 10 (i.e., in a direction from the front of the recovery hook towards the back of the recovery hook), which backward directed force exceeds the predetermined magnitude (i.e. a force that overcomes the compression forces exerted by the first and second fasteners 12, 14 on the recovery hook 10), the recovery hook 10 may move backwards with respect to the bracket 8 and thus with respect the first fastener 12 attached to the bracket 8. The backward movement of the recovery hook 10 is not impeded by the second section 32 since it has the front opening 34, which allows the shaft 58 of the first fastener 12 to escape the second section 32 and be arranged in the first section 30. Since the first section 30 is larger than the diameter of the head 60 of the first fastener 12, the first fastener 12 is free to move vertically through the first section 30 and the first fastener 12 no longer connects the recovery hook 10 to the bracket 8. At the same time, the backward movement of the recovery hook 10 causes a backward movement of the second fastener 14 with respect to the bracket 8, which results in the shaft 58 of the second fastener 14 to move back along the first and second slots 54, 56 and eventually escape out of the first and second slots 54, 56 through their respective opening 80, and thus the second fastener 14 no longer connects the recovery hook 10 to the bracket 8. The recovery hook 10 can thus break away from the frame 6 during a crash. Being disconnected from the vehicle 2, the recovery hook 10 may move rearward freely and thus may not cause damage in a collision.

Figure 19A:
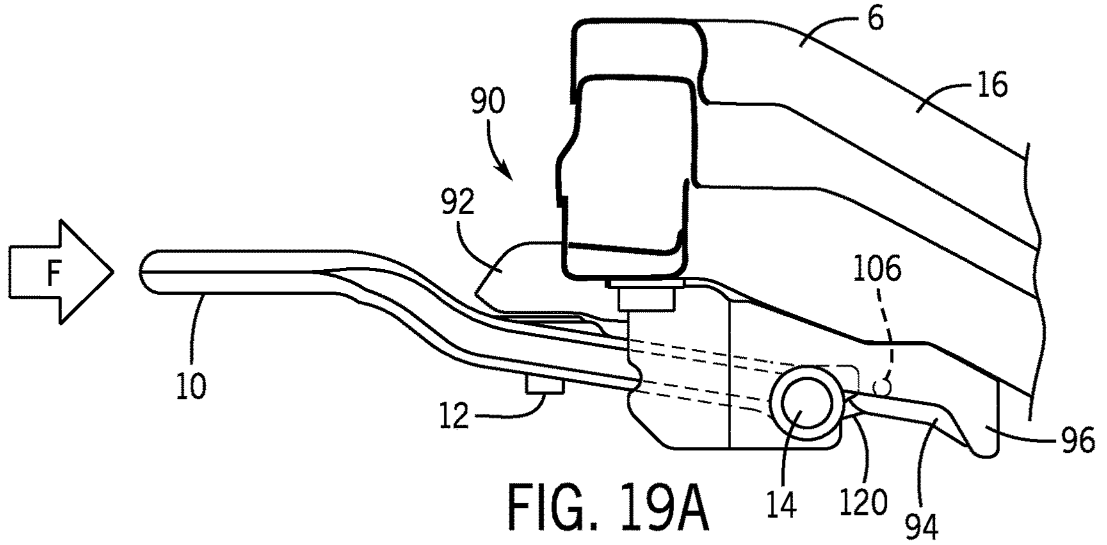
FIGS. 19A, 19B and 19C depict a force applied to the recover hook assembly and the releasing of the recovery hook from the subframe.
Figure 19B:
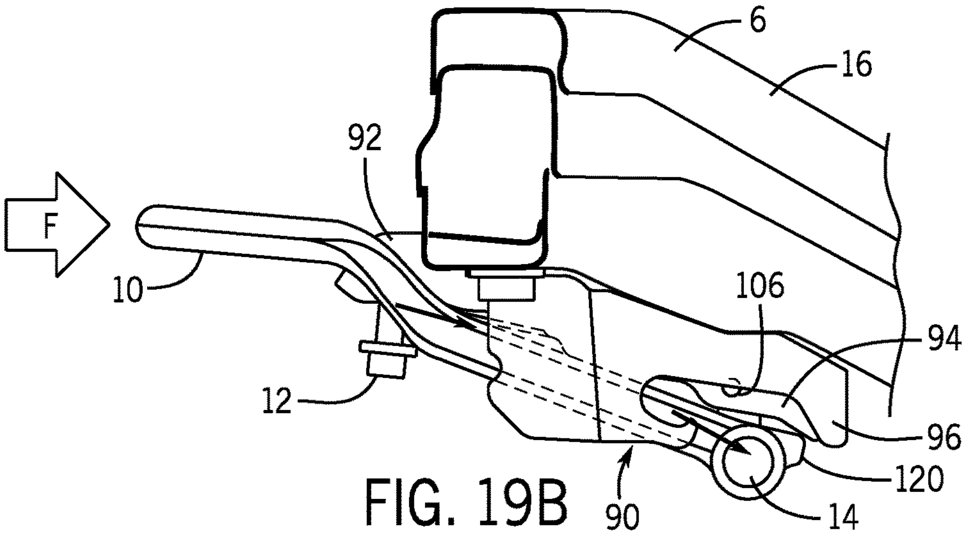
Figure 19C:
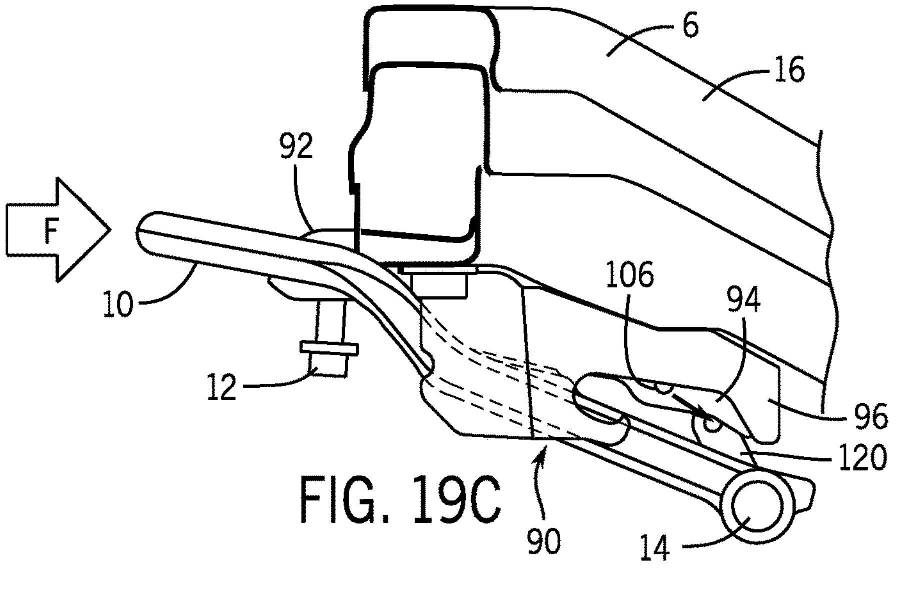

Regarding the bracket 90, as indicated, the mounting bracket 120 via the third fastener 108 further secures the recover hook 10 to the bracket 90. FIGS. 19A, 19B and 19C illustrate a crash event where the recovery hook 10 is released from the frame 6 of the vehicle. Because the third fastener 108 mounts the mounting bracket 120 to the bracket 90, to release the recovery hook 10 from the frame 10 to eliminate any impact on vehicle crash performance via a backward directed force (see, e.g., arrow "F" in the figures) on the recovery hook, the force on the recovery hook 10 has to exceed a predetermined magnitude that causes the third fastener 108 to shear from the bracket 90, thereby releasing the mounting bracket 120 from the bracket 90. It should be appreciated that such a magnitude of force overcomes the compression forces exerted by the first and second fasteners 12, 14 on the recovery hook 10. Therefore, as depicted in FIG. 19B the shearing of the third fastener 108 allows for disconnection of the first and second fasteners 12, 14 from the bracket 90 in a manner similar to the bracket 8 described above. Specifically, the backward movement of the recovery hook 10 allows the first fastener 12 to escape the second section 32 and then the first section 30 of the first through hole 24. At the same time, the backward movement of the recovery hook 10 causes a backward movement of the second fastener 14, which results in the second fastener 14 moving through and out of the first and second slots 102, 104 so that the second fastener 14 no longer connects the recovery hook 10 to the bracket 90. The recovery hook 10 can thus break away from the frame 6 during a crash (see FIG. 19C).

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A recovery hook for a vehicle, comprising:

a ring portion including a first through hole arranged at a front of the recovery hook, the first through hole including a first section configured to connect with a towing apparatus for towing the vehicle, and a second section having a front opening that opens into the first section, and configured to accept a first fastener inserted therethrough for connecting the recovery hook to the vehicle;

a base portion including a second through hole arranged at a back of the recovery hook and configured to accept a second fastener inserted therethrough for connecting the recovery hook to the vehicle; and a mounting bracket connected to the base portion, the mounting bracket including a third through hole configured to accept a third fastener inserted therethrough for connecting the recovery hook to the vehicle, wherein the first through hole extends through the ring portion in a first direction, and the second through hole extends through the base portion and the third through hole extends through the mounting bracket each in a second direction that is transverse to the first direction.

2. The recovery hook according to claim 1, wherein upon application of a force exceeding a predetermined magnitude to the recovery hook in a direction from the front of the recovery hook towards the back of the recovery hook, the third fastener is configured to shear allowing for disconnection of the first fastener from the ring portion and the second fastener from the vehicle, and release of the recovery hook from the vehicle.

3. The recovery hook according to claim 1 wherein the mounting bracket is mounted to the second fastener.

4. The recovery hook according to claim 1, wherein the second direction is perpendicular to a longitudinal axis of the recovery hook.

5. The recovery hook according to claim 1, wherein:

the ring portion includes a recessed flat surface around the second section on a bottom side of the recovery hook; and the recessed flat surface is configured to contact a head of the first fastener when the first fastener is inserted up through the second section for connecting the recovery hook to the vehicle.

6. The recovery hook according to claim 5, wherein:

the ring portion further includes a projecting flat surface around the second section on a top side of the recovery hook; and the projecting flat surface is configured to contact a mounting surface of the vehicle when the recovery hook is connected to the vehicle.

7. The recovery hook according to claim 1, wherein the mounting bracket when connected to the vehicle extends from the base portion away from the ring portion, the third fastener being located rearward of the second fastener.

8. A recovery hook assembly for a vehicle comprising:

a recovery hook, including:

a ring portion including a first through hole arranged at a front of the recovery hook, the first through hole including a first section configured to connect with a towing apparatus for towing the vehicle, and a second section having a front opening that opens into the first section, and configured to accept a first fastener inserted therethrough for connecting the recovery hook to the vehicle, a base portion including a second through hole arranged at a back of the recovery hook and configured to accept a second fastener inserted therethrough for connecting the recovery hook to the vehicle, and a mounting bracket connected to the base portion, the mounting bracket including a third through hole configured to accept a third fastener inserted therethrough for connecting the recovery hook to the vehicle; and an additional bracket configured to connect to the vehicle, the additional bracket including:

a first aperture, a second aperture, a first slot having a closed perimeter except for a first opening at a back of the first slot, and a second slot having a closed perimeter except for a second opening at a back of the second slot, wherein the first fastener extends through the second section and into the first aperture to thereby connect the recovery hook to the additional bracket;

wherein the second fastener extends through the first slot, through the second through hole, and into the second slot to thereby connect the recovery hook to the additional bracket; and wherein the third fastener extends through the mounting bracket and into the second aperture to thereby connect the mounting bracket to the additional bracket.

9. The recovery hook assembly according to claim 8, wherein, upon application of a force exceeding a predetermined magnitude to the recovery hook in a direction from the front of the recovery hook towards the back of the recovery hook, the third fastener is configured to shear disconnecting the mounting bracket from the additional bracket.

10. The recovery hook assembly according to claim 9, wherein after the shearing of the third fastener, the first fastener is configured to escape from the second section through the front opening and the second fastener is configured to escape from the first slot through the first opening and from the second slot through the second opening to thereby disconnect the recovery hook from the additional bracket.

11. The recovery hook assembly according to claim 9, wherein upon the recovery hook being disconnected from the additional bracket, the first fastener is configured to remain extending into the first aperture.

12. The recovery hook assembly according to claim 9, wherein upon the recovery hook being disconnected from the additional bracket, the second fastener is configured to remain extending horizontally through the second through hole.

13. The recovery hook assembly according to claim 8, wherein the connection of the mounting bracket to the additional bracket by the third fastener is located rearward of the connection of the second fastener to the additional bracket.

14. A vehicle including the recovery hook assembly of claim 8, and a frame, wherein the additional bracket is connected directly to the frame.

15. The vehicle according to claim 14, wherein the recovery hook assembly is arranged at a front of the vehicle and below a bumper beam of the vehicle.

16. The vehicle according to claim 14, wherein first fastener and the second fastener are not directly connected to the frame.

17. A recovery hook for a vehicle, comprising:

a ring portion including a first through hole arranged at a front of the recovery hook, the first through hole including a first section configured to connect with a towing apparatus for towing the vehicle, and a second section having a front opening that opens into the first section, and configured to accept a first fastener inserted therethrough for connecting the recovery hook to the vehicle;

a base portion including a second through hole arranged at a back of the recovery hook and configured to accept a second fastener inserted therethrough for connecting the recovery hook to the vehicle; and a mounting bracket connected to the base portion, the mounting bracket including a third through hole configured to accept a third fastener inserted therethrough for connecting the recovery hook to the vehicle, wherein the mounting bracket when connected to the vehicle extends from the base portion away from the ring portion, the third fastener being located rearward of the second fastener.

18. The recovery hook according to claim 17, wherein the first through hole extends through the ring portion in a first direction, and the second through hole extends through the base portion and the third through hole extends through the mounting bracket each in a second direction that is transverse to the first direction.

19. The recovery hook according to claim 17, wherein upon application of a force exceeding a predetermined magnitude to the recovery hook in a direction from the front of the recovery hook towards the back of the recovery hook, the third fastener is configured to shear allowing for disconnection of the first fastener from the ring portion and the second fastener from the vehicle, and release of the recovery hook from the vehicle.

20. The recovery hook assembly according to claim 19, wherein upon the recovery hook being disconnected from the vehicle, the first fastener is configured to remain extending into the first aperture and the second fastener is configured to remain extending horizontally through the second through hole.

* * * * *